(12) United States Patent
Damron et al.

(10) Patent No.: US 6,220,381 B1
(45) Date of Patent: *Apr. 24, 2001

(54) INTEGRATED AND INTERNAL BATTERY CHARGING SYSTEM FOR AN EV

(76) Inventors: Jane L. Damron; Philip C. Damron, both of 1611 Edwin Ave., Woodland, CA (US) 95695

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/258,915

(22) Filed: Mar. 1, 1999

(51) Int. Cl.⁷ ...................................................... B60K 1/00
(52) U.S. Cl. ........................................ 180/65.3; 180/165
(58) Field of Search ..................... 180/165, 65.1, 180/65.3, 65.4, 65.8

(56) References Cited

U.S. PATENT DOCUMENTS

| | | | | |
|---|---|---|---|---|
| 4,319,655 | * | 3/1982 | Hoppie | 180/165 |
| 5,215,156 | * | 6/1993 | Stalbach et al. | 184/65.3 |
| 5,337,560 | * | 8/1994 | Abdelmalek | 180/65.3 |

FOREIGN PATENT DOCUMENTS

7374193 * 7/1975 (FR) ..................... 180/65.3

* cited by examiner

*Primary Examiner*—Richard M. Camby

(57) ABSTRACT

An electrical generation system comprised of a swing axle apparatus that provides a suspension support platform for the generator and a single auxiliary wheel in contact with the road surface that provides rotational torque to the electrical generator via an integration of the auxiliary wheel shaft/armature shaft extension into a common component.

2 Claims, 2 Drawing Sheets

LEGEND

10 Frame Cross Member
12 Hinged Attachment
14 Stabilizing Arm
16 Bearing
18 Auxiliary Wheel
20 Armature Shaft Extension / Wheel Shaft
22 Generator
24 Wishbone Structure
26 Pivotal Connector
28 EV Frame Section
30 Rectifiers
32 Interconnecting Cables
34 Battery Pack

LEGEND

10 Frame Cross Member
12 Hinged Attachment
14 Stabilizing Arm
16 Bearing
18 Auxiliary Wheel
20 Armature Shaft Extension / Wheel Shaft
22 Generator
24 Wishbone Structure
26 Pivotal Connector
28 EV Frame Section
30 Rectifiers
32 Interconnecting Cables
34 Battery Pack

LEGEND

| | | | |
|---|---|---|---|
| 10 | Frame Cross Member | 28 | EV Frame Section |
| 12 | Hinged Attachment | 30 | Rectifiers |
| 14 | Stabilizing Arm | 32 | Interconnecting Cables |
| 16 | Bearing | 34 | Battery Pack |
| 18 | Auxiliary Wheel | 36 | Interconnecting Cables |
| 20 | Armature Shaft Extension / Wheel Shaft | 38 | Drive Motor |
| 22 | Generator | 40 | Drive Shaft |
| 24 | Wishbone Structure | 42 | Wheel(s) |
| 26 | Pivotal Connector | | |

INTEGRATED AND INTERNAL BATTERY CHARGING SYSTEM FOR AN EV

BACKGROUND OF THE INVENTION

1. Field of the Invention

The invention relates to mounting an electrical generator on a swing axle with auxiliary wheel apparatus; such apparatus providing the suspension/support system for the electrical generator, and such auxiliary wheel, in contact with the road surface, provides the rotation that spins the shaft of the generator.

2. Description of the Prior Art

During recent years, the prior art shows that electric vehicle technology has focused on building a better battery. Most recently hybrids combining gasoline and electric technology have been employed, but to date, no direct charging systems have been employed to facilitate battery charging while the vehicle is being driven.

OBJECTS OF THE INVENTION

Accordingly, the objective of this invention is to provide electric vehicles with a practical system that will provide energy to the battery pack while the vehicle is being driven.

Another object is to enhance electrical vehicle range by providing a continuous voltage charge to the battery pack while the vehicle is being driven.

Other objectives, advantages and novel features of the invention will become apparent to those skilled in the art upon examination of the invention and the accompanying drawings.

SUMMARY OF THE INVENTION

Figure 1:
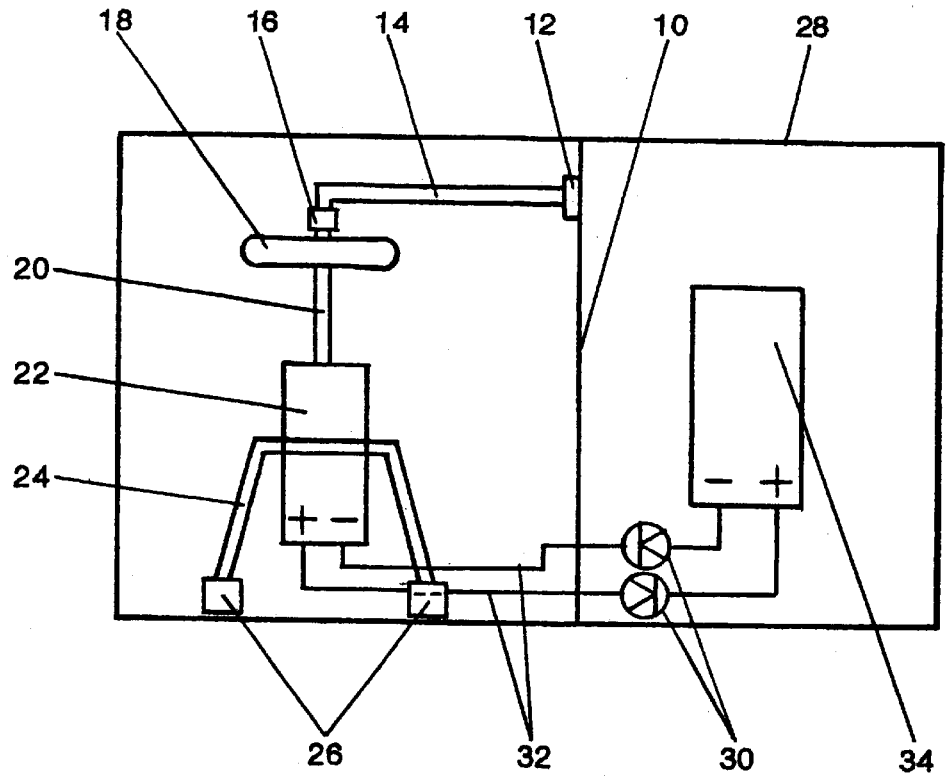

FIG. 1 is a schematic view of the swing axle with auxiliary wheel apparatus.

Figure 2:
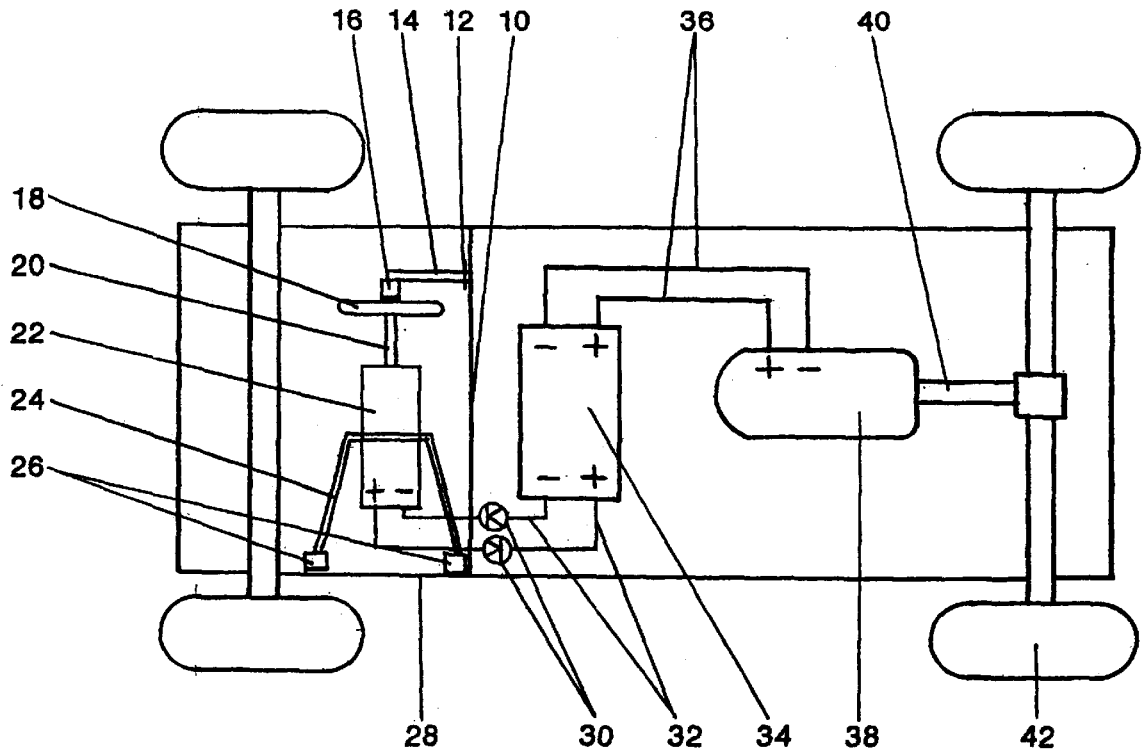

FIG. 2 is a schematic view illustrating how the invention would fit into a generalized EV. FIG. 2 illustrates a straight forward linear path for equipment and component placement. Variation may occur according to design features of individual EV's.

FIG. 1 shows the swing axle structured in a wishbone design with auxiliary wheel apparatus, which provides the support system for the electrical generator; such generator located in line with the apparatus. The apparatus and assembly beginning with the attachments are: a frame cross member 10, that gives a base for the hinged attachment 12, connected to the stabilizing arm 14, facilitated by a bearing 16, that allows rotation of the auxiliary wheel 18, which provides rotational torque to the armature extension shaft/wheel shaft 20, which is connected with a voltage regulated generator 22; such generator further supported by a wishbone structure 24, attached to the EV frame 28, by pivotal connectors 26. This assembly allows the generator to provide a charge to the battery pack 34, via rectifiers 30, interconnecting cables 32.

This apparatus and assembly of such apparatus is integrated within the EV. The lateral stability of the swing axle will be maintained by the stabilizer arm hinged to the frame cross member at one end. On the other end, it is attached to the extention of the armature shaft, at the hub of the auxiliary wheel, with a bearing housing that allows rotation and further maintains system stability. The swing axle structured in a wishbone design is attached to the EV frame by pivotal connectors completing the entire apparatus and providing a suspension/support system for an electrical generator.

The rotation of the auxiliary wheel as the vehicle is driven will provide the energy source to spin the generator shaft, thus providing a charge to the battery pack. Energy is inherent in any body that has mass and velocity. Kinetic energy, the energy of movement, provides the formula for a body in motion. It is:

$$KE = \frac{mv^2}{2}$$

A body possesses kinetic energy when it can do work because of its motion. One kind of energy can be transformed into another kind of energy. In the transformation of energy—no energy is lost. That is—no energy is destroyed or created in a generator or a motor; it is merely transformed.

If a body moves in circles about a fixed axis, it is angular motion, i.e. rotation. In this application, the mechanical energy activated by the auxiliary wheel, in contact with the road surface, is transformed into electrical energy in the generator. As long as the vehicle is in motion, this mechanical to electrical transformation will be occurring, providing the integrated charging system as postulated.

A small percentage of drag will occur from the swing axle auxiliary wheel system. Any drag will be more than offset by the large gain in terms of energy captured for use by the battery pack.

At all levels of motion, energy is flowing into the battery pack, i.e. acceleration, cruising, and the deceleration mode. During the acceleration mode, more energy will be consumed from the battery than is being replaced. During the cruising mode, the energy gained VS the energy used is typically not equalized, although very dependent upon the terrain, i.e. uphill. During the deceleration mode, the energy gain becomes most significant. As soon as the accelerator is released (slowing, coasting, downhill, and/or stopping), the EV motor stops drawing any current from the battery pack but the swing/axleauxiliary wheel driven generator continues to work, thus restoring large amounts of energy to the system.

The specification of the generator is critical. A wide range of rpm and a high output generator must be compatible with the rotational torque from the auxiliary wheel.

Another advantage to this concept is that it can be applied to all electric vehicles—auto, trucks, and multi-wheeled vehicles.

What is claimed is:

1. An electrical generation system comprising:
    a swing axle apparatus that has a support platform for a generator;
    a single auxiliary wheel that provides rotational torque created by contact with the road surface to said generator while the vehicle is in motion;
    a direct mechanical to electrical energy transfer provided to said generator by integrating an auxiliary wheel shaft/armature shaft extension into a common component.

2. An electrical generation system according to claim 1 wherein the said electrical generation system is integrated into an electric vehicle.

* * * * *

UNITED STATES PATENT AND TRADEMARK OFFICE
CERTIFICATE OF CORRECTION

PATENT NO.   : 6,220,381 B1
DATED        : April 24, 2001
INVENTOR(S)  : Damron et al.

It is certified that error appears in the above-identified patent and that said Letters Patent is hereby corrected as shown below:

Column 2,
Line 36, reads "typically not equalized" should read -- typically equalized --

Claim 1,
Line 52 and 53 reads "a swing axle apparatus that has a support platform for a generator" should read -- a swing axle apparatus that functions as the suspension/support platform for the generator --

Signed and Sealed this

Ninth Day of October, 2001

Attest:

NICHOLAS P. GODICI
Attesting Officer          Acting Director of the United States Patent and Trademark Office